US007827397B2

(12) United States Patent
McCoull et al.

(10) Patent No.: US 7,827,397 B2
(45) Date of Patent: Nov. 2, 2010

(54) GAMING MACHINE HAVING A SECURE BOOT CHAIN AND METHOD OF USE

(75) Inventors: James Ross McCoull, St Peters (AU); Robert Linley Muir, Artarmon (AU)

(73) Assignee: Aristocrat Technologies Australia Pty, Ltd. (AU)

( * ) Notice: Subject to any disclaimer, the term of this patent is extended or adjusted under 35 U.S.C. 154(b) by 524 days.

(21) Appl. No.: 11/777,180

(22) Filed: Jul. 12, 2007
(Under 37 CFR 1.47)

(65) Prior Publication Data
US 2008/0141017 A1 Jun. 12, 2008

(30) Foreign Application Priority Data
Jul. 13, 2006 (AU) .............. 2006903776
Dec. 18, 2006 (AU) .............. 2006907047
Jun. 14, 2007 (AU) .............. 2007903196

(51) Int. Cl.
*H04L 9/32* (2006.01)
*G06F 11/30* (2006.01)
*G06F 12/14* (2006.01)

(52) U.S. Cl. .............................. 713/2; 713/189
(58) Field of Classification Search ............... 713/2, 713/189, 193
See application file for complete search history.

(56) References Cited

U.S. PATENT DOCUMENTS

| 5,844,986 | A | * | 12/1998 | Davis ............... 713/187 |
| 6,106,396 | A | | 8/2000 | Alcorn et al. |
| 6,694,434 | B1 | * | 2/2004 | McGee et al. ........ 713/189 |
| 2004/0054952 | A1 | | 3/2004 | Morrow et al. |
| 2006/0116208 | A1 | | 6/2006 | Chen et al. |

FOREIGN PATENT DOCUMENTS

EP   1 489 567   12/2004
WO   WO 01/24012   4/2001

OTHER PUBLICATIONS

European Search Report corresponding to European Application Serial No. 07 11 2428, completed Jan. 30, 2008, 2 pages.

* cited by examiner

*Primary Examiner*—Thomas Lee
*Assistant Examiner*—Mohammed H Rehman
(74) *Attorney, Agent, or Firm*—McAndrews, Held & Malloy, Ltd.

(57) ABSTRACT

An electronic gaming machine (EGM) comprises a memory storing boot program code comprising first code; a central processing unit (CPU) arranged to access the memory and initiate a boot process by reading the first code from the memory; and a monitoring device having or with access to validation code and arranged to take at least one protective action if the first code does not match the validation code.

16 Claims, 8 Drawing Sheets

GAMING MACHINE HAVING A SECURE BOOT CHAIN AND METHOD OF USE

CROSS-REFERENCE TO RELATED APPLICATIONS

The present application relates to, and claims priority from, U.S. application Ser. No. 10/089,759, which claims priority as a national phase application of PCT/AU00/01192, which are herein incorporated by reference in their entirety. The present application also relates to, and claims priority from, Australian Patent Application No. 2006903776, filed Jul. 13, 2006, Australian Patent Application No. 2006907047, filed Dec. 18, 2006, and Australian Patent Application No. 2007903196, filed Jun. 14, 2007, which are herein incorporated by reference in their entirety.

FIELD

The present invention relates to a gaming machine and a method of protecting an electronic gaming machine.

BACKGROUND TO THE INVENTION

The development of an electronic gaming machine and program code to be run on gaming machines requires a great deal of effort. Further, given the nature of gambling regulations, there is a need for a high degree of confidence in the security of an electronic gaming machine. Accordingly, there is a need for electronic gaming machines that have a higher degree of security.

SUMMARY OF THE INVENTION

In a first aspect, the invention provides an electronic gaming machine (EGM) comprising:
a memory storing boot program code comprising first code;
a central processing unit (CPU) arranged to access the memory and initiate a boot process by reading the first code from the memory; and
a monitoring device having or with access to validation code and arranged to take at least one protective action if the first code does not match the validation code.

In an embodiment the EGM is arranged to monitor reading of the first code by the CPU.

In an embodiment wherein the monitoring device is arranged to access the memory prior to the memory being accessed by the EGM.

In an embodiment, the monitoring device stores the validation code.

In an embodiment, the monitoring device is a field programmable gate array (FPGA).

In an embodiment, the protective action is that monitoring device causes the EGM to terminate or fail booting.

In an embodiment, the boot program code comprises second code and the first code comprises a hash algorithm and a pre-calculated hash of the second code, the first code being arranged such that when the CPU executes the first code, the CPU calculates a hash of the second code and compares it to the pre-calculated hash and proceeds if the hashes match.

In an embodiment, execution halts if the hashes do not match.

In an embodiment, execution proceeds with execution of the second code if the hashes match.

In an embodiment, the memory storing the boot program code is read only.

In an embodiment, the boot program code comprises third code comprising a master private key signature of a pre-calculated hash of the third code, and the second code comprises a master public key (MPK) and a decryption algorithm, the second code being arranged such that when executed by the CPU, the CPU calculates a hash of the third code, decrypts the signature to obtain the pre-calculated hash, compares the two hashes and proceeds if the hashes match.

In an embodiment, the gaming machine comprises a further memory comprising a signature of one or more external BIOS hashes, and the third code is arranged such that the CPU verifies each external BIOS hash before transferring control to any of the one or more external BIOSes.

In an embodiment, the third code is arranged such that the CPU verifies the active boot partition on the active boot device by generating a hash of the boot partition and comparing it to a hash stored on the active boot device before transferring control to the master boot record of the active boot partition.

In a second aspect, the invention provides a method of protecting an electronic gaming machine comprising:
storing boot program code comprising first code in a memory; and
monitoring initiation of a boot process in which a central processing unit reads the first code from the memory by comparing the first code read by the CPU to validation code; and
taking at least one protective action if the read first code does not match the validation code.

In an embodiment the method comprises comparing the first code read by the CPU to the validation code.

In an embodiment the method comprises comparing the first code to the validation code prior to the first code being read by the CPU.

In an embodiment, the boot program code comprises second code and the first code comprises a pre-calculated hash of the second code, and the method comprises calculating a hash of the second code and comparing it to the pre-calculated hash and proceeding if the hashes match.

In an embodiment, the boot program code comprises third code comprising a master private key signature of a pre-calculated hash of the third code, the second code comprises a master public key (MPK), and the method comprises calculating a hash of the third code, decrypting the signature to obtain the pre-calculated hash, comparing the two hashes and proceeding if the hashes match.

In a third aspect, the invention provides an electronic gaming machine (EGM) comprising:
a central processing unit (CPU);
a memory storing boot program code; and
a removable memory device in data communication with the CPU and storing authentication data comprising a public key,
the CPU arranged to access the memory and initiate a boot process by reading the boot program code from the memory, the boot process including authenticating at least one set of code to be executed by the EGM by retrieving and employing the authentication data from the removable memory device.

In an embodiment, the authentication data is a public key. In another embodiment, the authentication data is a certificate comprising the public key and identity data.

In an embodiment, the at least one set of code comprises the code stored in a disk partition.

In an embodiment, the at least one set of code comprises operating system code.

In an embodiment, the at least one set of code comprises code of a program.

In an embodiment, the CPU authenticates the at least one set of code by employing the authentication data to authenticate intermediate authentication data and employing the intermediate authentication data to authenticate the at least one set of code.

In an embodiment, the EGM is arranged to authenticate the removable storage device prior to employing the authentication data.

Persons skilled in the art will also appreciate that the first and third aspects may be combined. In an embodiment, the monitoring device may be employed to authenticate the removable storage device.

In a fourth aspect, the invention provides a method of protecting an electronic gaming machine comprising:
storing boot program code in a memory;
storing authentication data in a removable memory; and
initiating a boot process in which a central processing unit reads the boot program code from the memory, the boot process including authenticating at least one set of code to be executed by the EGM by retrieving and employing the authentication data from the removable memory device.

Persons skilled in the art will appreciate that the first and second aspects of the invention may be combined with the third and fourth aspects.

BRIEF DESCRIPTION OF THE INVENTION

Exemplary embodiments of the invention will now be described in relation to the following drawings in which.

The foregoing summary, as well as the following detailed description of certain embodiments of the present invention, will be better understood when read in conjunction with the appended drawings. For the purpose of illustrating the invention, certain embodiments are shown in the drawings. It should be understood, however, that the present invention is not limited to the arrangements and instrumentality shown in the attached drawings.

DETAILED DESCRIPTION

First Embodiment

Figure 1:
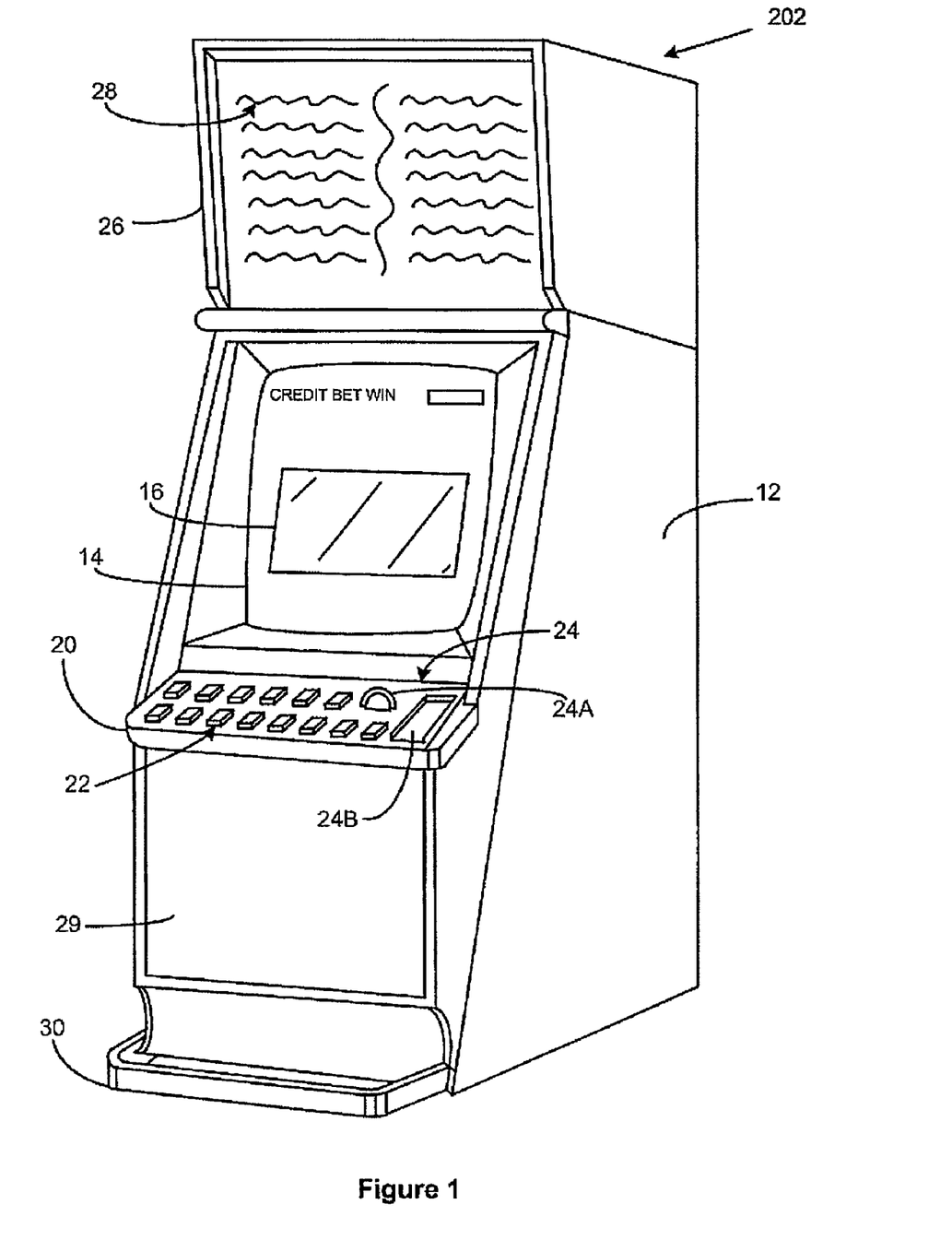
FIG. 1 is a perspective view of a gaming machine.
Figure 2:
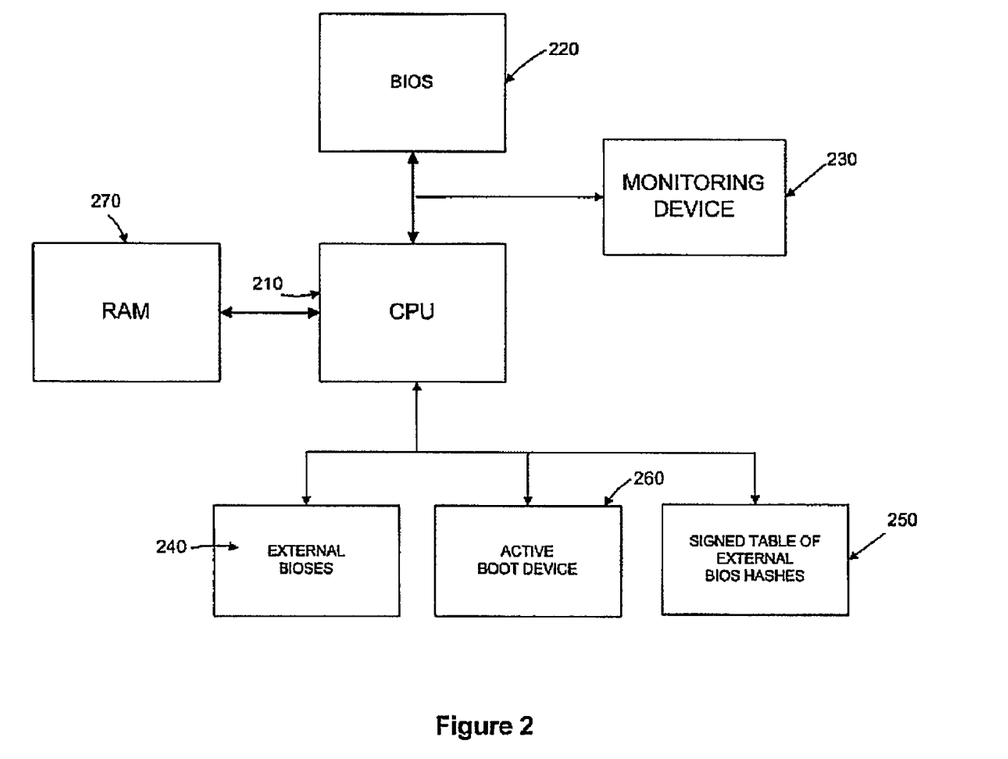
FIG. 2 is a schematic diagram of the main components of the gaming machine of a first embodiment that relate to implementation of a secure boot chain.
Figure 3A:
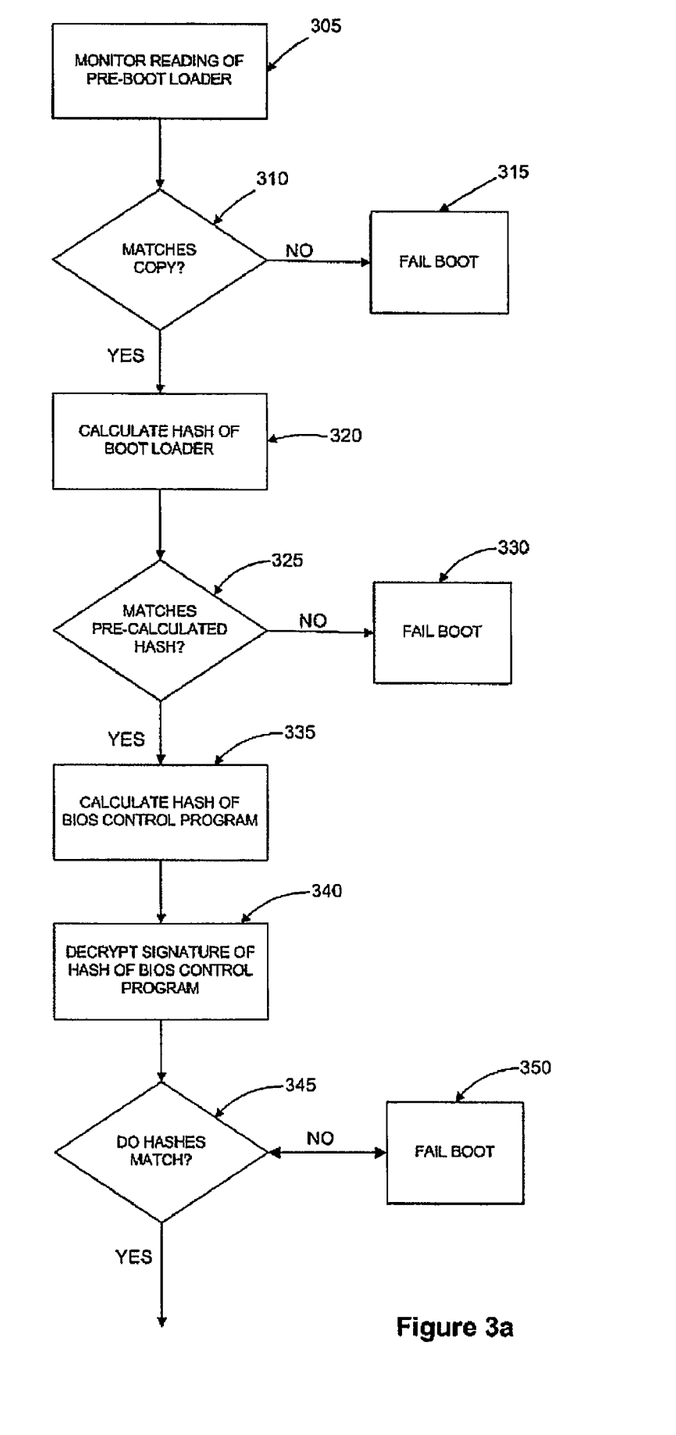
FIGS. 3A and 3B show a flow chart of the secure boot chain in accordance with an embodiment of the present invention.
Figure 3B:
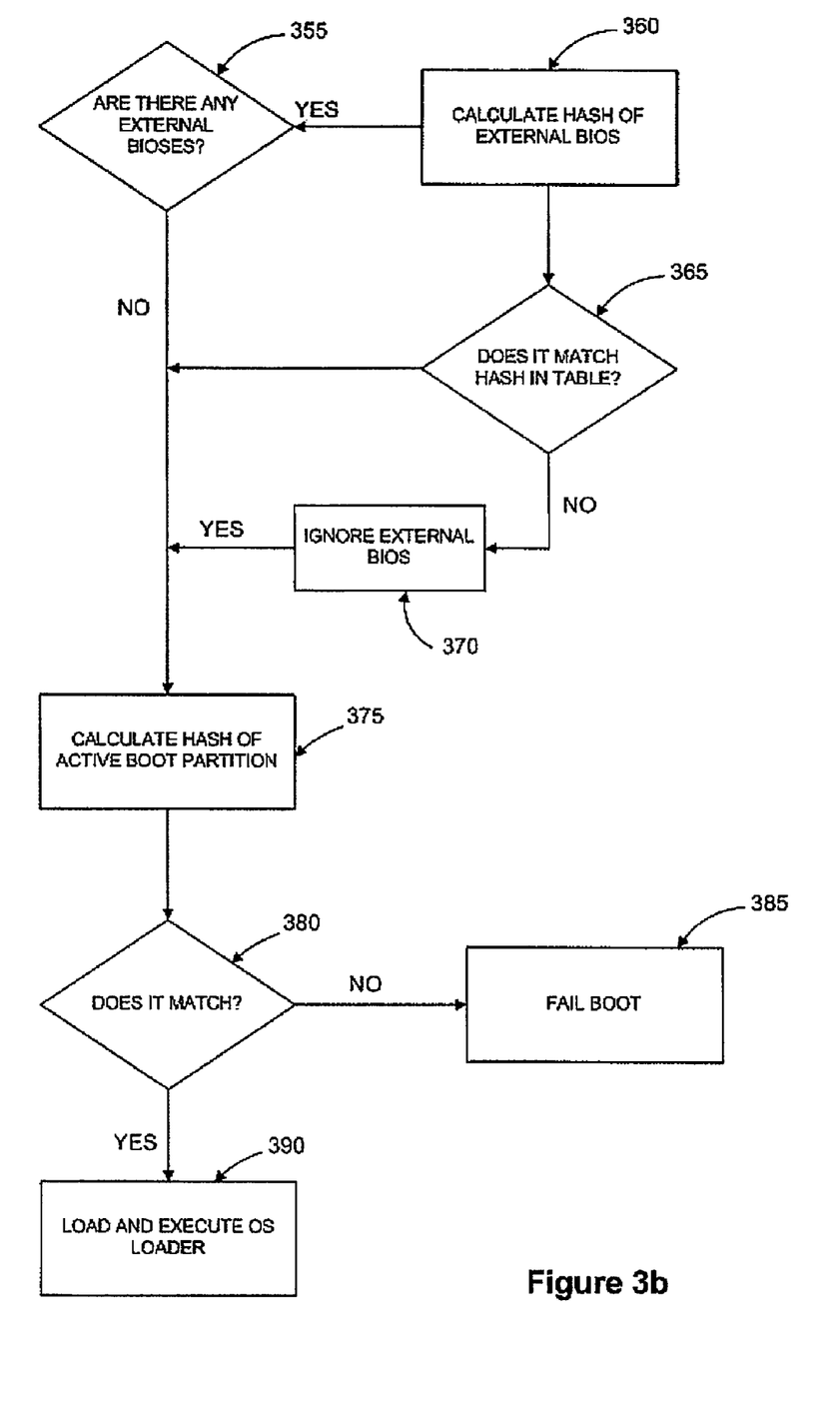

Referring to the drawings, there is shown in FIGS. 1 to 3, a first embodiment of an electronic gaming machine arranged to implement a secure boot chain during which a series of code portions are validated.

A gaming machine 10 is illustrated in FIG. 1. The gaming machine 10 includes a console 12 having a display 14 on which is displayed representations of a game 16 that can be played by a player. A mid-trim 20 of the gaming machine 10 houses a bank of buttons 22 for enabling a player to interact with the gaming machine, in particular during game play. The mid-trim 20 also houses a credit input mechanism 24 which in this example includes a coin input chute 24A and a bill collector 24B. Other credit input mechanisms may also be employed, for example, a card reader for reading a smart card, debit card or credit card. A reading device may also be provided for the purpose of reading a player tracking device, for example as part of a loyalty program. The player tracking device may be in the form of a card, flash drive or any other portable storage medium capable of being read by the reading device.

A top box 26 may carry artwork 28, including for example pay tables and details of bonus awards and other information or images relating to the game. Further artwork and/or information may be provided on a front panel 29 of the console 12. A coin tray 30 is mounted beneath the front panel 29 for dispensing cash payouts from the gaming machine 10.

The display 14 shown in FIG. 2 is in the form of a video display unit, particularly a cathode ray tube screen device. Alternatively, the display 14 may be a liquid crystal display, plasma screen, any other suitable video display unit, or the visible portion of an electromechanical device. The top box 26 may also include a display, for example a video display unit, which may be of the same type as the display 14, or of a different type.

As illustrated in FIGS. 2 and 3, the electronic gaming machine has a central processing unit (CPU) 210. Boot program code forms a BIOS and is stored in a read only memory 220. Logically the boot program code consists of first, second and third code referred to hereafter as a pre-boot-loader, a boot-loader and a BIOS-control-program.

The different portion of code contains components for different security features. Specifically: the pre-boot-loader contains a SHA 1 hash of the boot-loader; the boot loader contains a DSA master public key; and the BIOS control program contains a DSA signature of the BIOS control program SHA 1 hash that is signed by the DSA master private key corresponding to the DSA master public key.

As illustrated in respective FIG. 3, when the electronic gaming machine is reset, the CPU 210 of electronic gaming machine begins executing the first instruction of the pre-boot-loader stored in the BIOS 220. The monitoring device 230 snoops every read access to the pre-boot-loader to thereby monitor reading of the pre-boot-loader by the CPU 305. The monitoring device is implemented by a field programmable gateway and contains a duplicate copy of the pre-boot-loader monitors access to the BIOS 220 that provides validation code that can be used to determine that the pre-boot-loader is valid. The monitoring device verifies that the pre-boot-loader read out by the CPU matches 310 the validation copy of the pre-boot-loader stored in the monitoring device. If it does not match, the monitoring device halts operation in such a manner that this will ultimately cause the electronic gaming machine to fail booting 315. Thus, this ensures that the electronic gaming machine is running a valid, unmodified copy of the pre-boot-loader and hence that the code to check the validity of the boot-loader (as described in further detail below) is still present and will be executed by CPU 210.

The pre-boot-loader then copies the boot loader to random access memory 270. The pre-boot-loader calculates a SHA 1 hash of the boot-loader copy that is held in RAM. The pre-boot-loader verifies that the calculated hash matches the pre-calculated hash that is stored in the pre-boot-loader is described above. If following calculation of the hash the boot-loader 320 it is determined at step 325 that there is no match 325, the boot sequence fails 330. If there is a match, execution is transferred to the boot loader copy in RAM.

These set of steps ensure that the electronic gaming machine is running an unmodified copy of the boot-loader and that the code to check the validity of the BIOS-control-program is still present and will be executed. The boot-loader runs from RAM to eliminate the risk of removing the boot program stored in the BIOS socketed device between verification and execution.

At step 335 the boot-loader calculates a hash of the BIOS control program and copies the BIOS control program to RAM. The boot-loader then retrieves a DSA signature from the BIOS-control-program and retrieves the DSA master public key from the boot-loader. The boot-loader decrypts the signature of the BIOS-control-program hash 340 and determines 345 whether the hashes match. If the hashes fail to match booting is failed 350. Otherwise the verification is successful and execution is transferred to the BIOS-control-program now stored in RAM. The BIOS-control-program then seeks to verify any external BIOS 240 by reference to a signed table of external BIOS hashes 250. The CPU 220 calculates a hash of each external BIOS 360. It decrypts the signed table of external BIOS hashes 250 using DSA and the DSA master public key contained in the boot-loader. Each external bios 240 is hashed and compared to the now decrypted stored hash 365. Any external BIOSES not matched are ignored at step 370. Otherwise control is transferred to the external BIOSes.

These steps ensure the electronic gaming machine is running a BIOS control program that has been signed by a master private key.

Next before the BIOS-control-program transfers control to the master boot record of the active boot partition on the active boot device 260 it verifies the active boot partition 375 by calculating a hash at the active boot partition and verifying the hash against the DSA signature stored on the active boot device using the DSA master key and DSA. If it does not match at step 380 the boot is failed at 385. Otherwise the process proceeds to load and execute the operating system at step 390. These steps ensure the electronic gaming machine is running an operating system and system software that had previously signed by the DSA master key.

Persons skilled in the art will appreciate that the exact sequence of step may vary with a particular BIOS implementation but will in force that code passes a DSA signature verification step before it is executed.

Persons skilled in the art will appreciate that there maybe variations on the above boot sequence. For example, while the above embodiment employs SHA 1 hashes and DSA signatures, other crypto graphic hashes and signatures maybe employed. For example SHA 1-HMAC or RSA or a mixture of techniques. Further, while we have described the use of RAM to avoid hot swapping cache memory could be used instead. There may also be some additional steps carried out before software is executed. For example, the signature of system and game software components may be checked by checking the entire disk partitions, directories or individual files. Such checks may be performed on demand, that is immediately prior to a component being loaded or in advance, that is prior to any components being accessed. Further in some instances it may be appropriate to check components with multiple signatures. This allows the loading of a component to be prevented if it has not been signed by all required parties which may include the manufacture of the gaming machine, a regulatory body or a third party developer.

Further, certificates rooted in the master public key may be stored with the software components than the public keys. Herein the term "authentication data" is used to refer collectively to a public key, a certificate rooted in the public key, or other authentication data including a public key.

Second Embodiment

Figure 4:
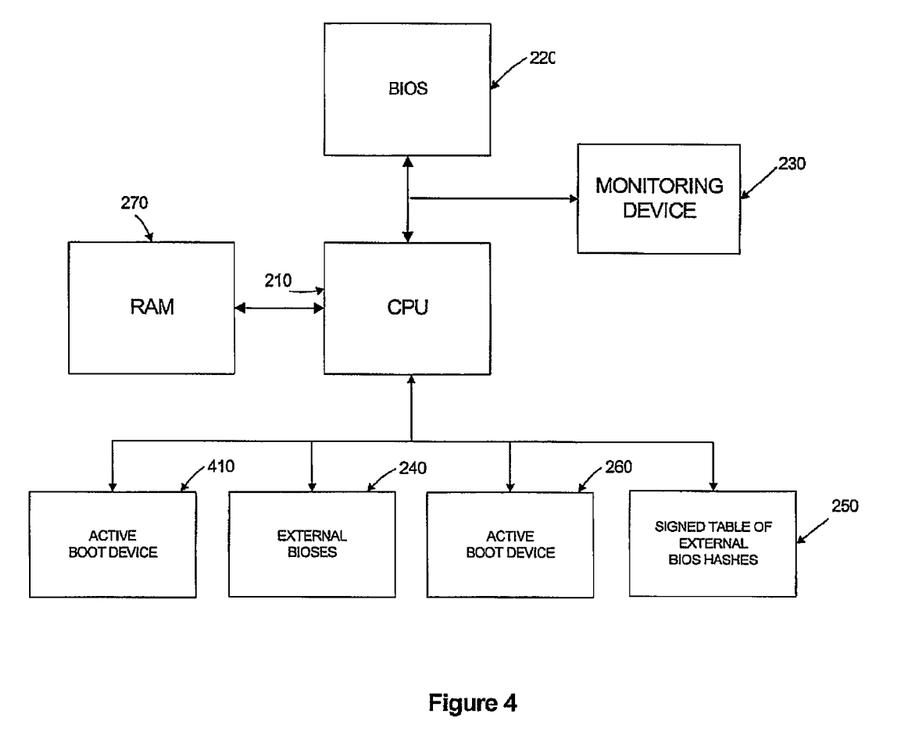
FIG. 4 is a schematic diagram of the main components of a gaming machine of a second embodiment.

FIG. 4 shows a second embodiment where the boot loader acquires a public key from a removable storage device 410 such as an authenticated smart card. In the remainder of FIG. 4 the same numbering is used as in the first embodiment. As discussed above, the boot loader can be used to verify a signature of system and game software either individually or by verifying the partitions on which they are stored. Accordingly, the key (or alternatively a certificate rooted in the public key) is retrieved from the smart card and employed to verify the signatures of the programs or partitions. This allows the approximation of revocation of previously signed program by not producing any smart cards with the relevant matching public key. This can be used in order to revoke incorrectly signed software before it is released. Further, it allows control of the number of software images in active use.

A person skilled in the art will appreciate that while it has been described above that the key stored on the smart card is used to verify signatures of programs/partitions it can equally be used to verify certificates of public keys that are in turn used to verify signatures of programs/partitions.

In an embodiment, the credentials of the smart card are as established as earlier as possible in the boot sequence. For example by employing the monitoring device to determine whether the smart card is valid in a similar manner in relation to which the first code is processed above. Further, rather than relying on keys being encoded within the BIOS, in some implementations it may be desirable to retrieve a key or keys stored on the smart card to use in an earlier part of the boot sequence for example, to verify the external BIOSes.

Figure 5:
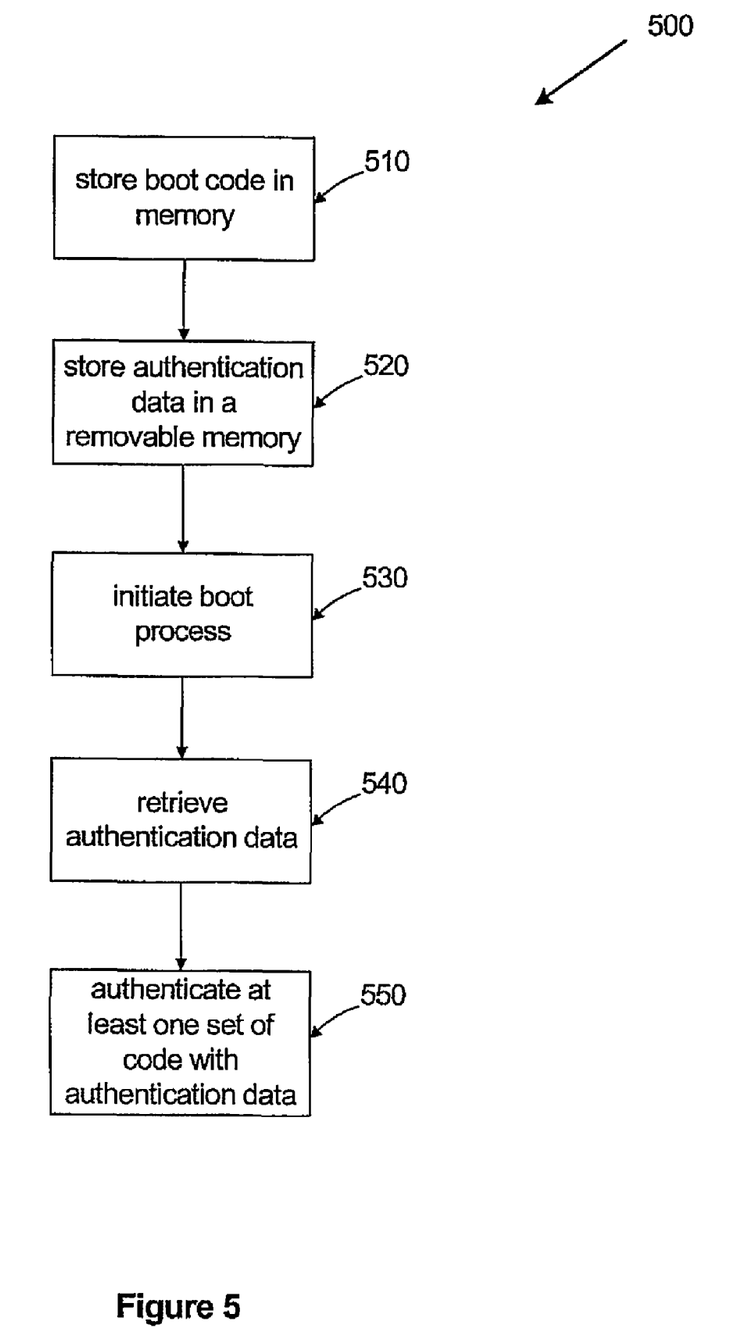
FIG. 5 is a flow chart of a method of a second embodiment.

The process 500 is summarised in FIG. 5. Boot code is stored in memory 510 and authentication data is stored in a removable memory 520. The boot process is initiated 530 and authentication data is retrieved 540 from the removable storage device. The method then involves authenticating 550 at least one set of code with the authentication data. The key from the smart card is then trusted until the next boot.

A person skilled in the art will appreciate that the removable storage device should be readily removable such as a smart card, USB token, or the like.

Third Embodiment

In a third embodiment an Application Specific Integrated Circuit (ASIC) is used instead of the FPGA of the first embodiment as the monitoring device. As in the first embodiment, a boot memory contains the software that is first executed by the CPU when it exits the reset state. Monitored memory (or hash checked memory) may also be used to store those parts of the software that access critical security functions.

For example the ASIC may contain logic which can enable or disable access to cash payment mechanisms or auditing information. By putting the enabling switch in monitored memory it becomes possible to check the security and authentication of the machine software before enabling or disabling these features.

Figure 6:
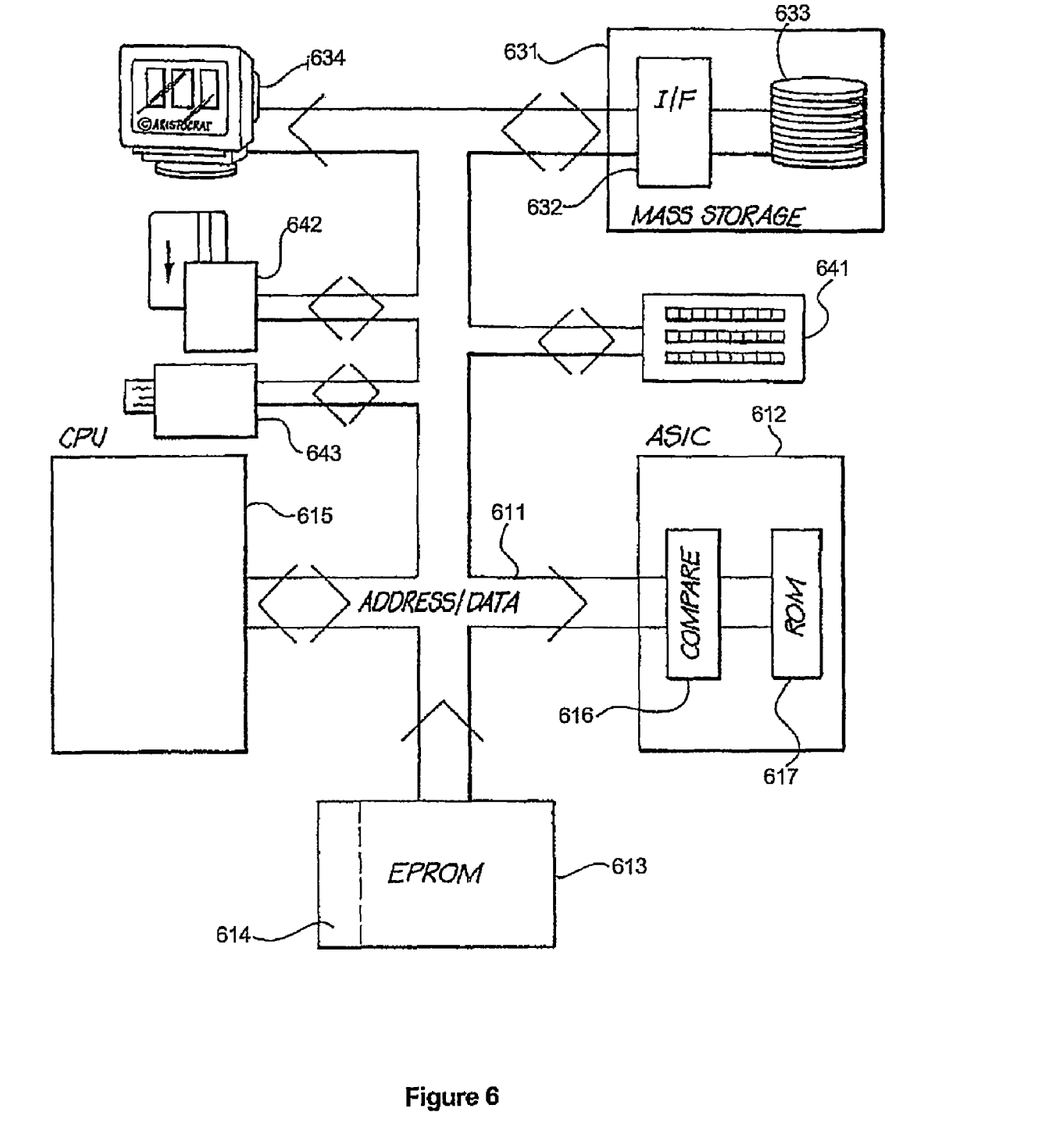
FIG. 6 is a further schematic diagram of a gaming machine.

The boot program is checked by monitoring the CPU address and data buses 611, as shown in FIG. 6. The ASIC 612, which monitors the buses 611 contains a copy (in internal ROM) of the data in a portion 614 of the boot EPROM 613. When each word of data is fetched from EPROM 613 by the CPU a compare function 616 of the ASIC 612 first checks the address to see if it is within that area duplicated in the internal ROM 617, and if it is it then checks the data word that the CPU 615 is reading from the EPROM 613 against the appropriate word in the internal ROM 617. If the data is the same then the CPU 615 is using the correct data from EPROM 613, but if it is different then there is either an accidental error or deliberate tampering. In this event the ASIC 612 takes appropriate action which may include resetting the board and/or stopping other operations of the ASIC 612 internally.

In the an embodiment, the CPU address and data bus 611 are multiplexed together to reduce the number of pins used. Non-multiplexed buses may also be used.

The ASIC 612 may also contain logic to ensure that all memory locations in the monitored memory are checked. If all locations within the monitored area are not checked when an inappropriate access is made outside the monitored area the check fails and the board locks up. An inappropriate access is an instruction fetch or write cycle. Read cycles are allowed, to enable the software in the monitored region to check other parts of memory.

Two implementations of this are:
1. The address bus 611 is monitored and a register is used to store a scanned address value location. Whenever the address from the CPU matches the value in this register the register is incremented. The memory check is complete when the address register reaches the end of the monitored memory.
2. A signature of address accesses may be implemented. Each address is combined in some form with the previous addresses to generate a fixed pattern. If the sequence of addresses is not the same as the original stored pattern then the check fails. For example each address may be combined using a CRC algorithm with the previous address's although preferably a more secure algorithm would be used.

Other implementations of monitored memory are possible:
1. Instead of checking the program as it is executed, the ASIC disables the EPROM and substitutes data to the CPU from its internal ROM. The ASIC thus acts as a memory device.
2. The ASIC reads the contents of the monitored EPROM area before the CPU exits the reset state and generates a cryptographic hash of the data. Only if this hash matches a predefined value is the test passed.
3. Instead of checking the data as it is read from EPROM the ASIC reads the EPROM contents and verifies it before allowing the CPU out of the reset state.
4. In a variation of the above two implementations, the ASIC allows the CPU to fetch the first word of a program after exiting reset, but inserts into this read cycle the verification reads from EPROM. It is more difficult to tamper with this method as the cycles are not separated clearly.

To provide further protection the monitored boot area may be read and monitored at a later time after the test has passed and game software is running. This provides protection against some forms of tampering where tampered memory is substituted for the original memory after the test passes.

This scheme is most effective with as much functionality of the board as possible implemented in the ASIC. One method of tampering is to replace the entire ASIC, but if significant other functionality is included it becomes a serious technical problem to redesign the ASIC.

Additionally the more critical the ASIC is to the functioning of the board then the more difficult it is to get the board working again if the monitoring circuit disables the operation of the ASIC internally.

If the monitored memory test fails, the board and ASIC are typically reset to protect the gaming machine. Alternately program execution is allowed to continue but certain features of the ASIC are disabled, preventing the board from being used in its full capacity. This allows the software to display appropriate errors messages (especially in the case of accidental memory errors), but effectively stops tampering having any real consequence. In the case of gaming machines, certain critical functions will also be inhibited such as software access to hardware meters 641, and inhibiting input and output of credit or the like, such as by way of the credit card reader 642 or ticket reader/writer 643.

The internal ROM of the ASIC is expected to be small compared to the size of the boot EPROM to reduce cost, although it could be the same size. Alternately, and as described above, the cryptographic hash check may be embedded in the ASIC.

The size of the EPROM to be securely checked can be increased to the total size of the memory in the system without increasing the size of the ASIC internal ROM by embedding a checking program in the area of EPROM that is checked by the ASIC. The checking program generates a cryptographic hash over the entire memory area to be checked (which may include the area monitored by the ASIC) and compares it to a pre-computed value. If it matches then the entire region is assumed to be unmodified. The method relies on it being difficult to tamper with the data which is included in the hashed area while retaining the same hash value and that the ASIC monitors the program which generates and checks the hash.

An advantage of this method is that the hash checking program is relatively small, and can be expected to be smaller than a comparable signature checking program. Therefore the size of the ROM in the ASIC may be reduced in size with this method.

A non-cryptographic checking algorithm may be used instead of the hash function, but algorithms such as checksum or CRC are relatively easy to tamper with and are not preferred.

The data to be checked, either directly by the ASIC or included in the hash-checked region, may include program or data. The data may include text messages such as "(© Aristocrat Leisure Industries" or "This software is authorized by Aristocrat Leisure Industries".

Once the initial part of the boot memory has been authorized it can then securely check the rest of the memory in the system.

The monitored memory area may use a hash mechanism to check more memory as described in the previous section or it may implement a digital signature check. The advantage with a digital signature check is in minimizing the amount of boot code that can never be changed without changing the ASIC. The advantage of a hash check is that a hash is simpler and therefore requires less program space for monitored memory than digital signature software.

Digital signatures are also used to authorize all other modules of software and data in the system, including system software and games. Each authorized EPROM or file has an associated digital signature which is checked. If invalid signatures are found the data will not be used and appropriate action will be taken, such as the machine locking up and displaying a message.

Figure 7:
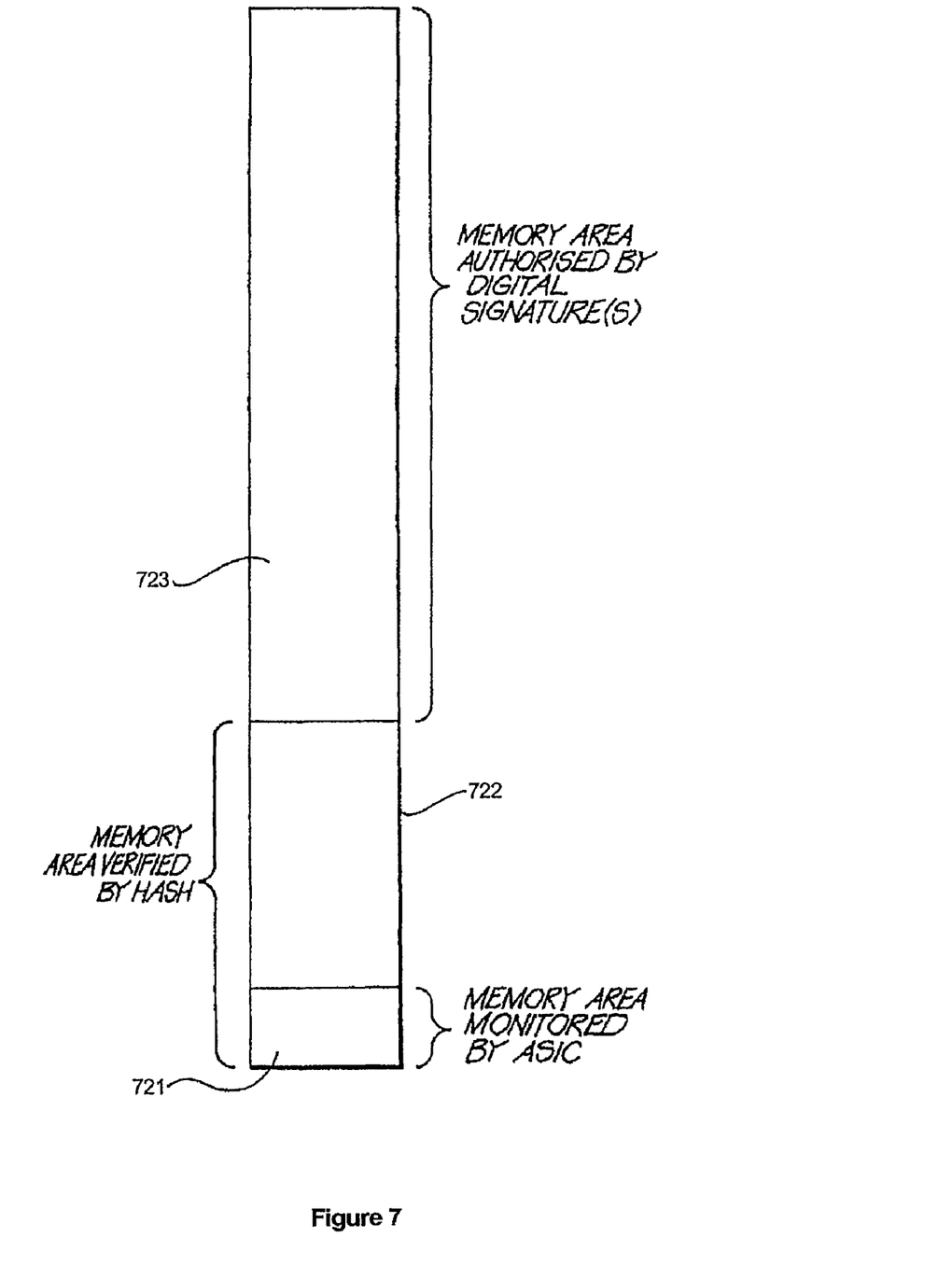
FIG. 7 is a memory diagram.

FIG. 7 shows a schematic of a memory map in which a first section of the memory space 721 is checked by the ASIC 612, a second part of the memory space 722 is checked by a hashed code and a third part of the memory space 623 is checked by digital signature. The memory space checked by the checking software may include or exclude the area in which the checking software resides. In the example illustrated in FIG. 7 the signature checked memory space 723 does not encompass the memory space 721 containing the checking software (i.e. the space monitored by the ASIC) but the hash checked memory space 722 does encompass the memory space 721.

In an embodiment, continuous monitoring of the authenticity of software provides extra security. The memory contents are periodically rechecked to ensure that changes have not occurred.

Continuous monitoring requires a method of getting the CPU to start executing software within the monitored (or alternately hash checked, although this is not as secure) memory area.

Once the CPU starts executing software within this secure area it can again perform authorization checks of the system as required. A watchdog type monitor is implemented in the ASIC which must be accessed periodically from software executing within the secured memory area otherwise the ASIC will force the system to shutdown. This transfer to secure area may be simply by software jumping to an address periodically or caused by an interrupt from the ASIC.

The ASIC is able to detect that software is executing from the monitored area. The method used depends on the processor implementation. For processors which support identification of external bus cycles an instruction fetch from a predefined address is used. For processors without identification of bus cycles and also without internal cache memory a sequence of memory accesses is detected that may only be generated by software executing within the monitored area. For CPU without bus cycle identification and also with cache it may not be possible to guarantee detection of monitored area software execution. Tampering could take place by execution of software within the cache so that external cycles appeared to be the correct software accesses.

An alternate method of guaranteeing execution within monitored memory is to periodically reset the CPU. In this implementation the CPU is able to be reset separately from the rest of the system. Prior to being reset, the CPU saves it's operational state in memory for restoration after the authentication checks have been completed. After the ASIC has reset the CPU then the CPU must be executing from monitored memory. A flag in the ASIC indicates the cause of the reset so the CPU knows whether to execute cold start reset code or continuous monitoring code. While the CPU is in the reset state the ASIC checks the state of the relevant pins to ensure that the CPU actually has been reset. In the preferred implementation the ASIC contains a timer which is initialized after each reset and which locks up the board when it reaches a predefined count. The timer would require that the CPU be reset every five minutes for example. Periodically and at least less than every 5 minutes the system software saves the system state and instructs the ASIC to reset the CPU and also timer. The system software can choose a point in it's operation where a slight delay while the CPU resets is not noticeable. Alternately the ASIC generates an interrupt periodically which the system software responds to by saving the CPU state and then the CPU resets.

These authentication checks are as described in the rest of the document. The authentication check can be divided into a number of these execution periods to divide the CPU loading over time. In this case the check software may need to store information between the periods (such as the last memory location checked). Although this data may be stored in RAM, it is accessible by any software running on the machine and could be tampered with. Preferably the ASIC implements some RAM that is only accessible by software running within the monitored memory area.

One possible method of tampering is to find start execution code within the monitored area, which was not intended as a start address for the routine and which has side effects unintended by the system programmers.

This side effect would access the flag in the ASIC without running the security check. One method of preventing this is to implement an address signature check as described for "ASIC Monitored Memory". A significant section of code must be executed correctly for the signature to be correct and it must be from the correct address. Many other methods are possible.

One method of tampering with the system is to allow the correct boot code to be executed after reset and during authentication, then at an appropriate point map into the program memory a new section of code (e.g. in hardware swap EPROMS with a multiplexer circuit). This memory may be automatically mapped in an out of memory space depending on where program execution is being performed. The authentication check reads the original data and passes, but when control is passed elsewhere a different program is executed. To prevent this attack, at a random time the ASIC reads from the CPU data bus the instruction fetched from memory, and stores it in a register together with the address from which it was read. When the periodic authentication check is performed it reads these registers and compares them with the data it reads from the same location. If the data is different then tampering has taken place. This test will eventually, at a random time, detect tampering. To speed up this test more than one data location may be sampled. Because it may take some time before tampering is detected it is preferable that when tampering is detected this information is stored so that the machine cannot be used until this condition is acknowledged by the operator and fixed. It should be stored in non-volatile memory, and preferably non-erasable memory.

True random number generation is not usually feasible in an ASIC and instead pseudo-random numbers are typically used instead. The pseudo-random number may be randomized further by combining it with some external information, such as the contents of the data or address bus.

An alternate method is to use DMA or bus mastering by the ASIC to automatically read the contents of memory and verify the data. This method is most suitable for the boot code, as the complexity of the design for more equivalent functionality to that easily achieved in secure software to very high—although it is possible.

These methods allow the verification of programs and data in boot memory and which is not possible to tamper with by simply changing the program memory.

An advantage of these security systems is that non-volatile re-writable memory can be used to hold the boot program. Even if tampered code were somehow loaded into memory the security mechanisms would prevent it being executed.

An advantage of Application Specific Integrated Circuit (ASIC) monitored memory and hash checked memory security mechanisms is that relatively simple logic is required in the ASIC and the rest of the security mechanism is in software. If the entire mechanism were placed in the ASIC it would be far more complex, costly, less flexible and take longer to design.

Fourth Embodiment

The above methods may also be supplemented by a further method that involves embedding into the authorized software a message which makes a legal statement about that software and it's ownership or authorization. Such a statement might include a text message such as "This Software Is Authorized By Aristocrat Leisure Industries" or "© Aristocrat Leisure Industries".

The authentication hardware or software expects that the message be embedded in the program/data it is authenticating. If the message is not present in the appropriate place the authentication test fails and the data/program is not used. Unlike digital signatures this method is technically easy to cheat, by embedding the message, but provides legal recourse to the manufacturer if it is detected. Digital signatures are technically difficult but potentially legally weak. The two methods may be combined to provide both legal and technical security.

Referring to FIG. 6, components of a gaming machine are shown. After the secure boot routines held in the EPROM 613 have been verified as discussed below, these routines can be used to load programs from a mass storage system 631 such as a hard disk drive 633 and controller/interface 632. Other mass storage systems can also be used such as a CD or DVD ROM drive, a floppy disk drive or ZIP™ drive. The mass storage system 631 may be local to the CPU and read via the buses 611, or may be remote and data sent to a writable memory local to the CPU over a network. The program will be loaded from the mass storage device into RAM by a loader program, which is preferably held in EPROM 613, but could also be held in a ROM associated with a logic circuit such as the ROM 617 of the Application Specific Integrated Circuit (ASIC) 612. In alternative embodiments, the ASIC 612 may be replaced by a Field Programmable Gate Array (FPGA). As the program is read from the mass storage device 631, the loaded code is scanned for a predetermined text string embedded in the code such as "© Aristocrat Leisure Industries".

The scanning may either be performed in software by a routine in the loader program, or alternatively the ASIC 612 may be programmed to scan the data flowing over the buses 611 and locate the text string. In another embodiment, a hard wired scanning circuit can be connected to the busses 611 to scan for the string. This method of verification may be used instead of a hash code or encrypted signature, but in the preferred embodiment is used as well as an encrypted signature or hash code verification method.

Once the loaded program has been verified, the embedded text string will be displayed on a display device 634 such as the video display screen of a gaming machine on which the program is running, such that visual confirmation of the validation is provided. This display function is performed by the loaded program thereby also enabling detection of fraudulent use of software on other manufacturers hardware. The loaded program also performs internal consistency checks to prevent alteration or deletion of the text string.

Fifth Embodiment

The Multigame authorization system allows games to be used only on the system for which they are authorized. The System program confirms the authorization of the game before it is allowed to be used.

Preferably game authorization comprises one or more of the following steps:

The header section of the game memory is checked to confirm that it is an appropriate game (e.g. not another system EPROM incorrectly used, has valid version numbers, etc).

The game header is checked for the legal authorization message.

The game header checksum or CRC is checked to ensure memory integrity.

If the games are digitally signed, then the digital signature(s) are validated.

The authorization of the game to run on this particular gaming machine is checked.

If the authorization fails the gaming machine may either continue without allowing that game to be used, stop and ask the operator to remove the game from the machine, or run that game only in demonstration mode.

Preferably each gaming machine contains a unique identification number which the CPU can read and use as part of the authorization code.

This can be implemented using a Dallas Semiconductor serial identification chip (e.g. DS2401).

If the authorization fails games may run in a limited mode and display an appropriate message on the screen. The limited mode may prevent the machine accepting or paying out money or updating critical auditing information.

Sixth Embodiment

An EPROM authorization message is created by applying a digital signature to a message composed of the unique Game Identifier, a unique Gaming Machine identifier and any usage restrictions that may be required (e.g. date restriction on game operation). The signature is generated in a secure environment and sent to the gaming machine where it is stored in non-volatile memory for later use.

The secure environment may be:

Within a smartcard. A service technician or operator may authorize the game to run on the machine by connecting the smartcard to the machine where the game is installed. To limit accidental or deliberate fraud the smartcard preferably contains a limit on the number of games that can be authorized. The smartcard may be inserted into a special purpose interface on the gaming machine, a general purpose interface such as is used for player marketing cards or via a PC and communication interface (e.g. RS232 or Ethernet) with a smartcard reader.

The gaming machine supplier may generate the authorization key and supply it to the service technician/operator for entry into the gaming machine.

The authorizations may be encoded into a removable EEPROM chip which is supplied to the operator with the new games.

Persons skilled in the art will appreciate that various of the above embodiments may be combined with other embodiments or modified to incorporate features of other embodiments.

These and other variations will be apparent to persons skilled in the art and should be considered as falling within the invention described herein.

The invention claimed is:

1. An electronic gaming machine (EGM) comprising:
a memory storing boot program code comprising first code, second code and third code;
a central processing unit (CPU) arranged to access the memory and initiate a boot process by reading the first code from the memory; and
a monitoring device having or with access to validation code and arranged to take at least one protective action if the first code does not match the validation code,
wherein the first code comprises a hash algorithm and a pre-calculated hash of the second code, the first code being arranged such that when the CPU executes the first code, the CPU calculates a hash of the second code and compares the calculated hash to the pre-calculated hash and proceeds if the hashes match; and wherein the third code comprises a master private key signature of a pre-calculated hash of the third code, and the second code comprises a master public key and a decryption algorithm, the second code being arranged such that when executed by the CPU, the CPU calculates a hash of the third code, decrypts the signature with the master public key to obtain the pre-calculated hash, compares the two hashes and proceeds if the hashes match.

2. An ERM as claimed in claim 1, wherein the EGM is arranged to monitor reading of the first code by the CPU.

3. An EGM as claimed in claim 1 wherein the monitoring device is arranged to access the memory prior to the memory being accessed by the EGM.

4. An EGM as claimed in claim 1 wherein the monitoring device stores the validation code.

5. An EGM as claimed in claim 1 wherein the protective action is that the monitoring device causes the EGM to terminate or fail booting.

6. An EGM as claimed in claim 1 wherein execution halts if the hashes do not match.

7. An EGM as claimed in claim 1 wherein the memory storing the boot program code is read only.

8. An EGM as claimed in claim 1 further comprising a further memory comprising a signature of one or more external BIOS hashes, and the third code is arranged such that the CPU verifies each external BIOS hash before transferring control to any of the one or more external BIOSes.

9. An EGM as claimed in claim 1 wherein the third code is arranged such that the CPU verifies the active boot partition on the active boot device by generating a hash of the boot partition and comparing it to a hash stored on the active boot device before transferring control to the master boot record of the active boot partition.

10. An electronic gaming machine (EGM) as claimed in claim 1 further comprising:
    a removable memory device in data communication with the CPU and storing authentication data comprising a public key, the CPU arranged to access the memory and initiate a boot process by reading the boot program code from the memory, the boot process including authenticating at least one set of code to be executed by the EGM by retrieving and employing the authentication data from the removable memory device.

11. An EGM as claimed in claim 10 wherein the authentication data is a certificate comprising the public key and identity data.

12. A method of protecting an electronic gaming machine comprising:
    storing boot program code comprising first code in a memory, second code and third code; and
    monitoring initiation of a boot process in which a central processing unit reads the first code from the memory by comparing the first code read by the CPU to validation code; and
    taking at least one protective action if the read first code does not match the validation code,
    wherein the first code comprises a pre-calculated hash of the second code, and the method comprises calculating a hash of the second code and comparing it to the pre-calculated hash and proceeding if the hashes match; and
    wherein the third code comprises a master private key signature of a pre-calculated hash of the third code, the second code comprises a master public key (MPK), and the method comprises calculating a hash of the third code, decrypting the signature to obtain the pre-calculated hash, comparing the two hashes and proceeding if the hashes match.

13. A method as claimed in claim 12, comprising comparing the first code read by the CPU to the validation code.

14. A method as claimed in claim 12 comprising comparing the first code to the validation code prior to the first code being read by the CPU.

15. A method as claimed in claim 12 comprising:
    storing authentication data in a removable memory; and
    initiating a boot process in which a central processing unit reads the boot program code from the memory, the boot process including authenticating at least one set of code to be executed by the EGM by retrieving and employing the authentication data from the removable memory.

16. A method as claimed in claim 15 wherein the authentication data is a certificate comprising the public key and identity data.

* * * * *